United States Patent
Piipponen et al.

(10) Patent No.: US 8,711,816 B2
(45) Date of Patent: Apr. 29, 2014

(54) LINK ESTABLISHMENT IN A WIRELESS COMMUNICATION ENVIRONMENT

(75) Inventors: Antti Piipponen, Tampere (FI); Aarno Pärssinen, Espoo (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 810 days.

(21) Appl. No.: 11/885,530

(22) PCT Filed: Mar. 4, 2005

(86) PCT No.: PCT/FI2005/050063
§ 371 (c)(1),
(2), (4) Date: Aug. 31, 2007

(87) PCT Pub. No.: WO2006/092465
PCT Pub. Date: Sep. 8, 2006

(65) Prior Publication Data
US 2008/0205317 A1    Aug. 28, 2008

(51) Int. Cl.
*H04W 4/00*    (2009.01)
*H04L 12/413*    (2006.01)
*H04B 15/00*    (2006.01)

(52) U.S. Cl.
USPC ........... 370/338; 370/443; 370/447; 370/462; 455/11.1; 455/41.2; 455/450

(58) Field of Classification Search
USPC ......... 370/203–210, 310–313, 322, 329, 341, 370/348, 431, 437, 443, 462; 455/11.1, 455/13.4, 343.1–343.6, 450–455, 464, 509, 455/515–516, 574
See application file for complete search history.

(56) References Cited

U.S. PATENT DOCUMENTS

| | | |
|---|---|---|
| 5,949,776 A | 9/1999 | Mahany et al. |
| 6,108,542 A | 8/2000 | Swanchara et al. |
| 6,112,081 A | 8/2000 | Namura et al. ............... 455/424 |
| 6,498,925 B1 | 12/2002 | Ciccarelli et al. |
| 6,542,517 B1 | 4/2003 | Giacaione |
| 6,647,273 B2 | 11/2003 | Parssinen et al. ............. 455/522 |

(Continued)

FOREIGN PATENT DOCUMENTS

| | | |
|---|---|---|
| EP | 1 530 316 A1 | 5/2005 |
| EP | 1 714 442 | 8/2005 |

(Continued)

OTHER PUBLICATIONS http://www.sigmoblie.org/mobicom/2003/posters/11-Chen.pdf
Dazhi Chen et al., "Protecting Wireless Networks Against a Denial of Service Attack Based on Virtual Jamming Introduction", Jul. 31, 2003.

*Primary Examiner* — Habte Mered
(74) *Attorney, Agent, or Firm* — Harrington & Smith (57) ABSTRACT

The invention relates to link establishment in a wireless communication terminal. In order to obtain flexible and low power connections between a wireless terminal belonging to a short-range wireless network and an external wireless communication device not belonging to that network, a protection frame is sent either from the wireless communication terminal or from the external wireless communication device. The protection frame includes duration information used for virtual carrier-sensing in the short-range wireless network. In response to the protection frame, data is transferred between the wireless communication terminal and the external wireless communication device during a time period indicated by the duration information.

37 Claims, 3 Drawing Sheets

(56) References Cited

U.S. PATENT DOCUMENTS

| | | | |
|---|---|---|---|
| 7,023,824 B2 | 4/2006 | Khullar | 370/337 |
| 7,054,329 B2 * | 5/2006 | Cervello et al. | 370/447 |
| 7,164,671 B2 * | 1/2007 | del Prado et al. | 370/338 |
| 7,171,179 B2 | 1/2007 | Zhou | 455/226.2 |
| 7,299,021 B2 | 11/2007 | Parssinen et al. | 455/226.1 |
| 7,304,969 B2 | 12/2007 | Ryan et al. | 370/332 |
| 7,463,644 B2 | 12/2008 | Zhu et al. | 370/445 |
| 7,515,557 B1 | 4/2009 | Bims | 370/315 |
| 7,672,254 B2 | 3/2010 | Kim et al. | 370/256 |
| 7,742,443 B2 * | 6/2010 | Wentink | 370/318 |
| 2002/0163933 A1 | 11/2002 | Benveniste | |
| 2002/0196771 A1 | 12/2002 | Vij et al. | |
| 2003/0078007 A1 | 4/2003 | Parssinen et al. | 455/67.1 |
| 2003/0124999 A1 | 7/2003 | Parssinen et al. | 455/226.1 |
| 2003/0144020 A1 | 7/2003 | Challa et al. | |
| 2004/0128574 A1 | 7/2004 | Ricci et al. | |
| 2004/0229566 A1 | 11/2004 | Wang | |
| 2005/0124329 A1 * | 6/2005 | Yadav | 455/417 |
| 2005/0128970 A1 | 6/2005 | Tsien et al. | 370/315 |
| 2006/0029073 A1 * | 2/2006 | Cervello et al. | 370/389 |
| 2008/0232335 A1 * | 9/2008 | Del Prado Pavon et al. | 370/338 |
| 2010/0142493 A1 * | 6/2010 | Sakoda et al. | 370/336 |
| 2010/0142505 A1 * | 6/2010 | Hansen et al. | 370/338 |
| 2012/0008599 A1 | 1/2012 | Marin et al. | 370/336 |

FOREIGN PATENT DOCUMENTS

| | | |
|---|---|---|
| EP | 1 826 952 A1 | 8/2007 |
| KR | 1020040055083 | 6/2004 |
| WO | WO 02/071650 A1 | 9/2002 |
| WO | WO 03063539 | 7/2003 |
| WO | WO 2004107680 | 12/2004 |
| WO | WO 2005/076544 A1 | 8/2005 |
| WO | WO2006/040390 | 4/2006 |

\* cited by examiner

LINK ESTABLISHMENT IN A WIRELESS COMMUNICATION ENVIRONMENT

FIELD OF THE INVENTION

The invention relates generally to link establishment in a wireless communication environment. More particularly, the present invention concerns a mechanism for establishing a link between a wireless terminal belonging to a short-range wireless network and an external wireless communication device.

BACKGROUND OF THE INVENTION

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of one hundred meters or less. They often combine with systems wired to the Internet to provide communication over long distances. The category of short-range wireless systems includes wireless personal area networks (WPANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks use low cost, low power wireless devices that have a typical range of about ten meters. The best-known example of wireless personal area network technology is Bluetooth, which uses the 2.4 GHz ISM band. It provides a peak air link speed of one Mbps, and power consumption low enough for use in personal, portable electronics such as PDAs and mobile phones. Wireless local area networks generally operate at higher peak speeds of 10 to 100 Mbps and have a longer range, which requires higher transmission power, which in turn results in greater power consumption.

Wireless LAN systems are typically extensions of a wired network, providing mobile users with wireless access to the wired network. Examples of wireless local area network technology include the IEEE 802.11a, which is designed for the 5 GHz unlicensed band, and uses orthogonal frequency division multiplexing (OFDM) to deliver up to 54 Mbps data rates; the 802.11b, which is designed for the 2.4 GHz ISM band and uses direct sequence spread spectrum (DSSS) to deliver up to 11 Mbps data rates; and the HIPERLAN Standard, which is designed to operate in the 5 GHz unlicensed band.

In wireless LAN technology, two basic network topologies are available for network configuration: an ad-hoc network and an infrastructure network. An ad-hoc network is formed by two or more wireless terminals without the services of a base station, i.e. in an ad-hoc network the terminals communicate on a peer-to-peer basis. An ad-hoc network is normally formed for temporary purposes. The infrastructure network, in turn, comprises one or more wireless base stations, called access points, which form part of the wired infrastructure. In a typical network of this type, all traffic goes through the access points, regardless of whether the traffic is between two terminals or a terminal and the wired network, i.e. the wireless terminals do not communicate on a peer-to-peer basis.

The wireless terminals are typically provided with wireless LAN cards, whereby they can access the wired network or set up an ad-hoc network.

One drawback related to WLAN networks is the limited ability of a wireless terminal to communicate with external wireless communication devices when operating in an infrastructure network. Here, the term "external" is used to indicate that the relevant device is not associated with an access point of the infrastructure network and is therefore not operating in the infrastructure network. The limited ability to communicate with external wireless communication devices in turn translates to an inflexible communication environment. For example, to establish communications between a wireless terminal, such as a laptop, associated with the infrastructure network and a mobile phone not operating in the infrastructure network, it is first required that the mobile phone accesses the infrastructure network. After this, the traffic between the wireless terminal and the mobile phone travels typically through the relevant access point, even though the wireless terminal and the mobile phone are typically in close proximity to each other.

Another alternative for establishing short-distance communications is that the wireless terminal and the mobile phone establish an ad-hoc network for their mutual communications. However, if the wireless terminal enters the ad-hoc operation mode, the existing association in the infrastructure network is normally removed. In other words, the user of the terminal has to be authenticated again and a new association has to be created when the wireless terminal leaves the ad-hoc mode and re-enters the infrastructure network.

Another problem of the WLAN networks involves power consumption, i.e. the battery capacity of the wireless terminals. So far, wireless LAN technology has been used mainly in laptop computers, which are typically AC powered, but which may also be used in battery mode that provides a fairly high battery capacity. To prolong the life of the batteries, the WLAN standards define a specific power save mode into which the terminals may enter from an active mode in order to decrease their power consumption. In this mode, the terminals have to wake up periodically to receive regular beacon transmissions broadcast in the network to enable the terminals to communicate in an orderly fashion. The beacon transmissions indicate, for example, whether there are incoming packets buffered for a terminal. If so, the terminal retrieves the packets, goes back to sleep, and wakes up again to listen to the beacon transmission as per the sleep interval agreement.

The current WLAN power management has been designed assuming that the terminal devices are laptop type computers featuring a relatively high battery capacity. Along with the generalization of various other types of personal communication devices, such as intelligent phones, having a smaller size and thus also a lower battery capacity than laptop computers, power consumption has, however, become a critical issue when new properties are designed for wireless systems and terminals. The above-mentioned inflexibility of the network with regard to the establishment of short-distance communications further aggravates the problem of power consumption, since a link between the external communication device and the relevant access point located further away is needed if an ad-hoc network is not established for a short-distance point-to-point link.

The present invention seeks to accomplish a solution by means of which the flexibility of the WLAN environment may be improved in a manner that enables flexible establishment of low power connections between a wireless communication terminal belonging to a short-range wireless network and an external wireless communication device not belonging to the said network.

SUMMARY OF THE INVENTION

The present invention seeks to devise a new mechanism for facilitating the establishment of connections between a wireless communication terminal belonging to a short-range wireless network and an external wireless communication device not belonging to the said network. The present invention further seeks to devise a mechanism that allows low power consumption in the said terminal and device. Below, the wireless communication terminal and the external wireless communication device are also termed the wireless terminal and the external device, respectively.

In the present invention, a mechanism conventionally used in short-range wireless networks for virtual carrier-sensing is utilized in a novel way to protect a connection between a wireless terminal connected to an infrastructure network and an external wireless communication device not connected to that network. When a connection is to be established between the wireless terminal and the external device, the wireless terminal may utilize the virtual carrier-sensing mechanism of the infrastructure network and send a protection frame indicating to other members of the infrastructure network that the common medium is reserved and thus protecting the link to the external device. The said protection frame includes duration information that indicates the duration of the subsequent connection or the moment of time before which the duration is to be updated, if necessary. Depending on the embodiment of the invention, the protection frame may be addressed to the external device or to the wireless terminal itself. Furthermore, the external device may also act as the sender of the protection frame.

Thus one embodiment of the invention is the provision of a method for establishing a link in a wireless terminal or in an external device. Concerning the party sending the protection frame, the method includes the steps of sending a protection frame from a first wireless communication terminal, the protection frame including duration information used for virtual carrier-sensing in an infrastructure network and communicating, in response to the sending step, data with a second wireless communication terminal, wherein one of the first and second wireless communication terminals is operating in the infrastructure network and the other one of the first and second wireless communication terminals is external to the infrastructure network.

Concerning the party receiving the protection frame, the method includes the steps of monitoring receipt of a protection frame transmitted from a first wireless communication terminal, the protection frame including duration information used for virtual carrier-sensing in an infrastructure network, wherein the monitoring step is performed at a second wireless communication terminal, receiving the protection frame at the second wireless communication terminal, and communicating, in response to the receiving step, data with the first wireless communication terminal, wherein one of the first and second wireless communication terminals is operating in the infrastructure network and the other one of the first and second wireless communication terminals is external to the infrastructure network.

In further embodiments, the invention provides a wireless communication terminal or device for a wireless communication system. The wireless terminal includes link protection means for sending a protection frame including duration information used for virtual carrier-sensing in an infrastructure network and data transfer means, responsive to the link protection means, for communicating data with an external wireless communication device during a time period indicated by the duration information, wherein the external wireless communication device is external to the infrastructure network. The external device then includes monitoring means for monitoring receipt of a protection frame transmitted from a wireless communication terminal belonging to an external infrastructure network, the protection frame including duration information used for virtual carrier-sensing in the external infrastructure network and data transfer means, responsive to the monitoring means for communicating data with the wireless communication terminal during a time period indicated by the duration information. In case the external device sends the protection frame, it includes link protection means for the sending of a protection frame including duration information used for virtual carrier-sensing in an external infrastructure network and data transfer means, responsive to the monitoring means for communicating data with a wireless communication terminal belonging to the external infrastructure network during a time period indicated by the duration information.

In a still further embodiment, the invention provides a computer program product for controlling a wireless communication device. The computer program product includes a first computer readable program code portion configured to monitor receipt of a protection frame transmitted from a wireless communication terminal belonging to an external infrastructure network, the frame including duration information used for virtual carrier-sensing in the external infrastructure network and a second computer readable program code portion configured to cause the wireless communication device to initiate data transfer with the wireless communication terminal upon receipt of the protection frame.

The invention enables low-power "ad-hoc" type connections between a wireless terminal and an external device without a need for the former to disconnect from the infrastructure network, and also without a need to set up an ad-hoc network for such connections.

In further embodiments of the invention, the wireless terminal and the external device may reduce their power consumption by reducing the transmission power, by reducing the total time needed to listen to the common media, or by degrading the performance of their receivers. The latter alternative is beneficial especially when the common medium has to be listened to for longer periods.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIG. 1 to 5 in the appended drawings, wherein.

DETAILED DESCRIPTION OF THE INVENTION

Figure 1:
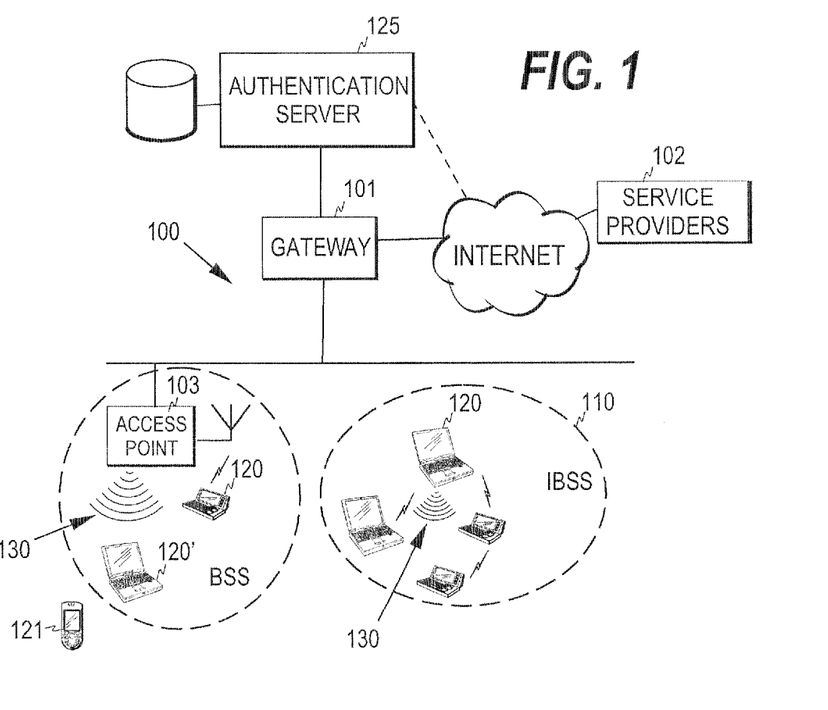
FIG. 1 illustrates a typical communication system in which the principles of the present invention may be beneficially implemented.

FIG. 1 illustrates a typical WLAN communication system. The system includes one or more WLAN networks 100, each connected by means of a gateway 101 (a router) to another network, such as the Internet, which contains service providers 102. Each WLAN network comprises one or more access points 103, each communicating wirelessly with the terminals within the coverage area, i.e. the cell, of the access point and thus forming a bridge between the terminals and the wired network.

In an infrastructure network an access point and at least one terminal is said to form a Basic Service Set (BSS). A series of BSSs then forms an Extended Service Set (ESS). These BSSs are connected to each other by a Distribution System (DS), which can be a wired network, such as an Ethernet LAN, within which TCP/IP packets are transmitted, or a wireless network, or a combination of these two. However, the basic type of an IEEE 802.11 LAN is an Independent BSS (IBSS), which consists of two or more terminals. The terminals of an IBSS form an ad-hoc network 110. It is to be noted here that the BSS and IBSS are 802.11-specific terms. Although the invention is not limited to the IEEE 802.11 standards, some of the terms used in this context may be 802.11-specific due to the lack of unambiguous, universal WLAN terminology.

The terminals of the invention are short-range wireless communication terminals, which may be portable computers, PDA equipment, intelligent phones or other such mobile terminals 120. In the same way as an ordinary GSM telephone, the user-operated terminals may be made up of two parts: the actual subscriber device and an identity module, whereby from the viewpoint of the network the subscriber device becomes a functioning terminal only when the identity module has been inserted into it. The identity module may be a (Universal) Subscriber Identity Module ((U)SIM), User Identity Module (UIM) or a (User) Integrated Circuit Card ((U)ICC), for example. However, the terminals may equally well be traditional WLAN terminals in which no identity modules are used. More examples of different terminal types are given later in the text.

The system further typically contains an authentication server 125 of the WLAN network. The authentication server is connected to the above-mentioned gateway through a secured connection, which is typically a TCP/IP connection established through an operator network or through the Internet. As shown in the figure, in an infrastructure network the access points broadcast beacon messages 130, while in an ad-hoc network the terminals share this responsibility.

As the present invention does not relate to the architecture of the WLAN system, it is not discussed in more detail here. The present invention concerns a situation in which a wireless terminal 120', such as a laptop, belonging to the infrastructure network is to start communications with an external device 121, such as a mobile phone, not belonging to the infrastructure network. The external device may be capable of accessing the infrastructure network, but has currently not done so, or it may be incapable of doing so. It is also possible that the external device is currently connected to a network other than the said infrastructure network.

Figure 2:
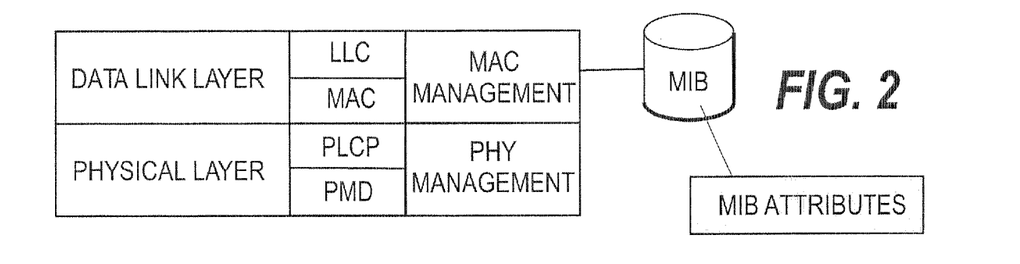
FIG. 2 illustrates the MAC entity utilized in IEEE 802.11 networks.

The IEEE 802.11 standards define the physical layer options and the MAC layer protocol for the wireless LAN. FIG. 2 illustrates the protocol architecture of the IEEE 802.11 standard. As shown in the figure, the actual MAC protocol operates in the lower sub-layer of the second layer of the OSI layer model, which is the Data Link Layer (DLL). The MAC management layer is responsible for the overall management of the MAC layer. It supports the association and roaming functionalities and controls the power saving functions, the authentication and encryption mechanisms, and synchronization of the terminals, for example. The MAC management layer further maintains a MAC layer management database, i.e. the MIB (Management Information Base) of the MAC layer. The MAC layer cooperates with the physical management layer to maintain the database. An example of the MAC layer attribute that may be utilized in the performance control mechanism of the invention is RSSI (Received Signal Strength Indicator), which indicates the level of the received signal. As discussed below, the RSSI is one example of a signal quality variable that may be utilized for power control in the external device and in the wireless terminal.

The physical layer is divided into two sub-layers, which are the PLCP (Physical Layer Convergence Protocol) sub-layer and the PMD (Physical Medium Dependent) sub-layer. The purpose of the PLCP is to provide minimum dependence on the PMD in order to simplify the interface between the physical layer and the MAC layer.

In a communication system as described in FIG. 1, the terminals have to sense the medium before they can transmit, to ascertain that the medium is idle. For this purpose, the IEEE 802.11 standards include a Carrier Sense Multiple Access/Collision Avoidance (CSMA/CA) media access control (MAC) protocol to avoid simultaneous transmissions (i.e. collisions). A common problem related to an environment like this is the so-called hidden node problem, which occurs when two nodes can communicate with a third node but cannot communicate with each other due to a long distance between the devices, obstacles blocking the radio transmissions, etc. For example, a terminal may access the medium since it cannot hear another terminal which is currently communicating with an access point or a third terminal. To address the hidden node problem, a mechanism called Request to Send/Clear to Send (RTS/CTS) was developed. However, this mechanism may also be used to reserve the common medium. This is discussed below.

In WLAN networks, two types of carrier sensing is used to determine if the common medium is free: physical carrier sensing and virtual carrier sensing. Physical carrier sensing involves detecting activity on the radio interface, while virtual carrier sensing is provided by a timer called the Network Allocation Vector (NAV). Most 802.11 frames contain a duration field which may be used to reserve the common medium for a fixed period. The duration field, which is in an 802.11 environment termed Duration/ID field, indicates the time that the channel will be reserved. The value of the duration field is used by other terminals to set the NAV value. The NAV timer counts down from the said value to zero. As long as the NAV value is nonzero, the virtual carrier sensing function indicates that the medium is busy.

In mixed networks including both 802.11b compatible terminals using Direct Sequence Spread Spectrum (DSSS) for transmitting data and 802.11g compatible terminals capable of using either DSSS or Orthogonal Frequency Spectrum Multiplexing (OFDM), collisions are possible between the transmissions of the terminals of different types. This is because the 802.11b compatible terminals cannot decode the OFDM transmissions of the 802.11g compatible terminals and therefore cannot read the messages sent via OFDM. The RTS/CTS mechanism is used to avoid such collisions: a terminal must first request access to the medium with an RTS message using DSSS and refrain from accessing the medium until the access point replies with a CTS message using DSSS. Other terminals receiving either the RTS or the CTS message will then refrain from accessing the medium.

As the RTS/CTS mechanism adds protocol overhead, which translates to reduced throughput, the 802.11g standard also provides a mechanism called CTS-to-self to protect the OFDM transmissions. The CTS-to-self is simply a CTS frame in which the receiver address field includes the MAC address of the sending terminal and in which the duration value protects the pending transmission(s).

In the present invention, the above mechanisms are utilized to establish a link between a wireless terminal belonging to an infrastructure network and an external device not belonging to said network.

Figure 3:
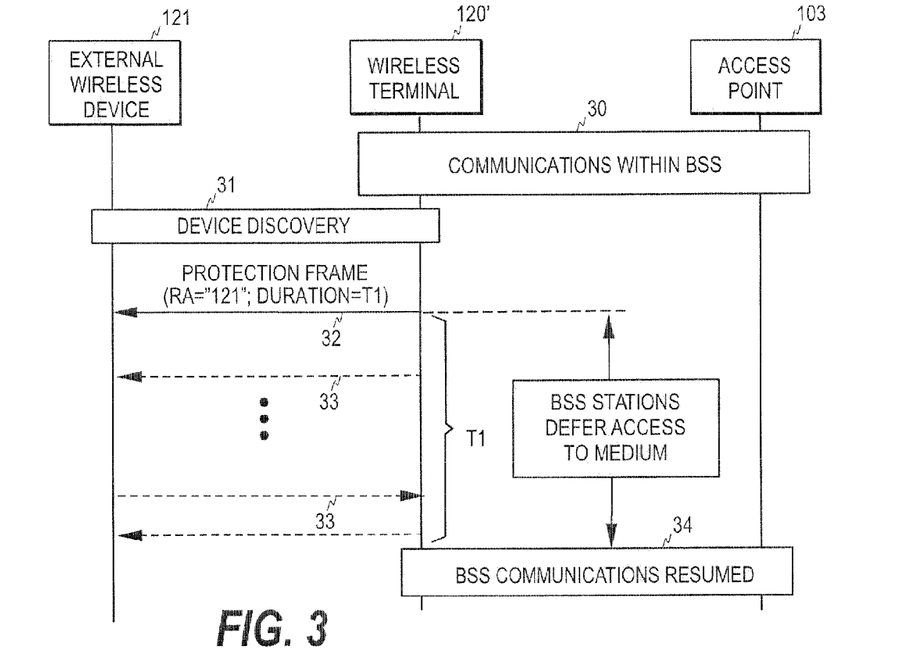
FIG. 3 is a diagram illustrating the message exchange in one embodiment of the invention when a point-to-point link to an external device is established.

FIG. 3 illustrates one embodiment of the invention by showing the message exchange associated with the link establishment. It is assumed here that a wireless terminal, such as a laptop 120' (FIG. 1), operating in an infrastructure network is to establish a point-to-point link to an external wireless communication device, such as a mobile phone 121, not belonging to the infrastructure network. It is further assumed here that the wireless terminal and the external device detect each other through normal methods of device discovery or through any predefined scheme. In connection with device discovery, the detected device(s) is/are typically presented to the user, whereby the user may manually select the device(s) with which communications are to be started. The terminal may also include a pre-stored list of the devices in whose proximity a point-to-point link is automatically established.

Normally when a wireless terminal is operating in an infrastructure network, all traffic originating from the terminal goes via the relevant access point 103, as is shown with reference numeral 30 in the figure. However, when the wireless terminal has detected (step 31) an external device in its proximity and the terminal (or its user) wishes to establish a point-to-point link to the external device, the terminal sends (step 32) a protecting frame that will update the NAV timer in the devices within the BSS. The frame is sent according to existing WLAN standards, except that the frame is addressed to the external device. The frame is thus sent at maximum power level and it includes the MAC address of the external device as the receiver address.

Furthermore, the terminal estimates the length T1 of the subsequent point-to-point session and uses the duration field of the protecting frame to set the NAV timers accordingly. Thus the NAV value may be set for the entire point-to-point session in the protection frame.

As a result, all devices within the BSS update the NAV value accordingly, i.e. the devices within the BSS defer access to the common medium until the NAV timer indicates that the medium is idle. In this way, the wireless terminal is able to guarantee uninterrupted transmission with the external device. After the protecting frame, either of the communicating peers may send the next frame onto the point-to-point link. Since the frames/messages following the protection frame do not normally have to update the NAV value, the said frames/messages may be transmitted at a reduced transmission power. The number of frames/messages and the type of data exchanged during the point-to-point connection may vary depending on the application in question.

After the period T1 has elapsed, the BSS may again resume its operation (step 34). In practice, T1 is substantially shorter than the beacon interval used in the infrastructure network, which is typically 100 ms. The wireless terminal may also divide the session into distinct periods separated by BSS communications. Period T1 may thus comprise the entire session or part of it. If necessary in terms of the operation in the infrastructure network, the entire session and/or the said periods may be scheduled according to the internal timing of the infrastructure network, such as the timing of the beacon broadcasts, so that the operation in the infrastructure network is not disturbed.

Figure 4:
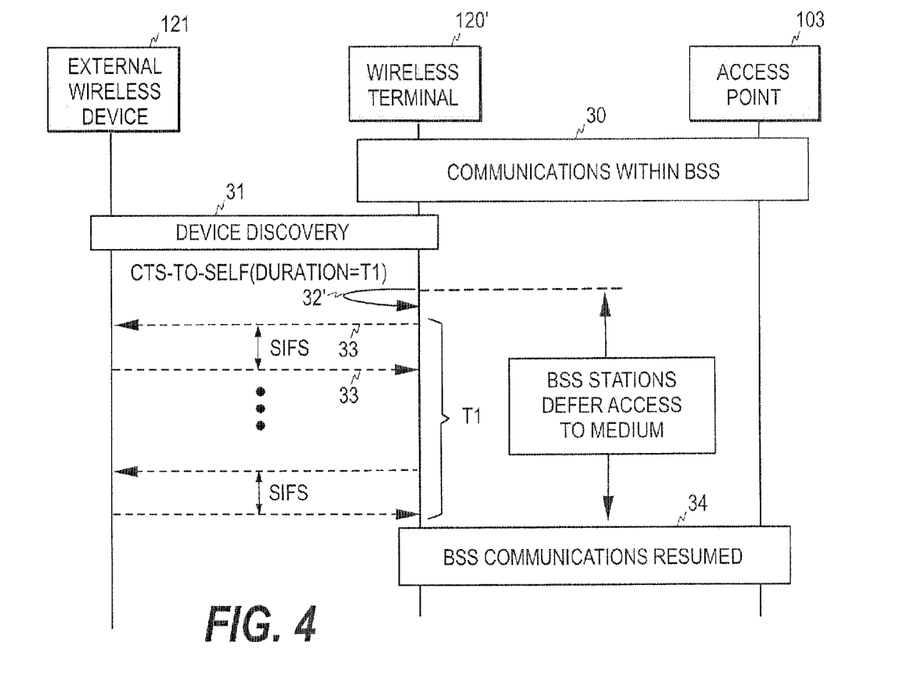
FIG. 4 is a diagram illustrating the message exchange in another embodiment of the invention when a point-to-point link to an external device is established.

FIG. 4 illustrates another embodiment of the invention. In this embodiment, the terminal sends a CTS-to-self frame (step 32') as a protection frame. The protection frame is thus a CTS frame in which the receiver address field contains the MAC address of the sending terminal and in which the value of the Duration/ID field protects the upcoming session with the external device. As above, all devices within the BSS, which hear the CTS-to-self transmission, update the NAV value accordingly.

An advantage of the embodiment of FIG. 3 is that it does not cause any overhead. However, the embodiment of FIG. 4 is the preferred embodiment since it does not require any changes in the operation of the WLAN network, i.e. the protection frame complies with existing WLAN standards.

In a further embodiment of the invention, the time interval between the frames sent between the wireless terminal and the external device is equal or substantially equal to the Short InterFrame Space (SIFS), which is the shortest inter-frame interval in IEEE 802.11 networks. SIFS is normally used for an ACK frame, a CTS frame, and in fragmented transmission between an ACK and the next fragment. Using the SIFS between subsequent frames, the duration of the frame exchange sequence, i.e. the point-to-point session, may be minimized. Furthermore, this also prevents the devices in the BSS from attempting to use the medium, since they must wait for a longer period than the SIFS for the medium to be idle.

As mentioned above, in one embodiment of the invention only the initiating frame, i.e. the protection frame, may be transmitted at a maximum or increased power level. Here, the maximum power level may refer to a device-specific maximum value or to a maximum power level defined for the network. This embodiment is to ensure that all the members of the infrastructure network hear the transmission and are thus able to update their NAV timers. Subsequent frames 33 transferred between the wireless terminal and the external device during the point-to-point session may then be transmitted at reduced power level, since the distance between the two devices is short. The receiver may also be adjusted to a lower power consumption mode with degraded sensitivity and/or dynamic range since the quality of the link is high enough due to the short distance.

It is also possible that either of the communicating peers notices during the point-to-point session that the length of the session needs to be updated. In this case a frame including a new NAV value may be transmitted at an increased power level during the point-to-point session. However, in another embodiment of the invention, in which the power reduction is not an important issue, the said subsequent frames may also be transmitted at the maximum or at an increased power level.

In a further embodiment of the invention, the protecting frame may be sent prior to the device discovery. This may be the case, for example, when the device discovery is based on the use of the WLAN radio. The protection frame may also be sent by the external device. For example, the external device may download the necessary parameters from the wireless terminal through a near field communication interface, such as a RFID interface, and send the protection frame in response to the download.

In a still further embodiment of the invention, no separate device discovery may be needed, if the devices are otherwise ready to start the point-to-point session. The detailed co-operation of the wireless terminal and the external device depends on the protocol defined for them. Based on the protocol the said terminal and device know, for example, when and how to poll each other.

Having discovered each other, the wireless terminal and the external device may verify the presence of each other by sending polling messages at regular intervals. In this way, the devices may measure a signal quality variable, such as the above-mentioned RSSI, needed for power control. In practice, the external device and the wireless terminal may have to be in close proximity to each other for long periods without the point-to-point transmissions being initiated. For example, the user may put the two devices next to each other, whereupon they may automatically detect each other through normal means of device discovery. However, the user may wish to start data transmission only later, and he/she may wish to transfer data sporadically when the two devices are close to each other. When the devices are in close proximity to each other, the device that listens to the medium to detect the transmission of the protection frame may reduce its power consumption by reducing the performance of its receiver in a manner described in the international patent application PCT/FI2004/000617 of the Applicant (filed on Oct. 15, 2004). The said international application discloses a method in which the power consumption of a wireless device may be decreased by degrading the performance of its receiver. Preferred methods for controlling the performance of the receiver include control of the dynamic range and/or the sensitivity of the receiver.

As the party receiving the protection frame, such as the external device, may have to listen to the medium for long periods in order to detect the protection frame, it may utilize the reception control mode described in the above-mentioned international patent application to reduce its power consumption. In the reception control mode, the said party controls the dynamic range and/or the sensitivity of its receiver in order to minimize the power consumption. The said party may also control its transmission power as is described in the said international patent application. The party sending the protection frame may also employ the power control mechanisms referred to above. However, as it does not have to monitor the protection frame, the said mechanisms may be more beneficial to the party receiving the protection frame.

In a further embodiment of the invention, the external device may also communicate with the relevant access point by using the wireless communication device as a router. In this embodiment, the wireless terminal thus supports the routing functionality, i.e. it buffers and relays the traffic between the external device and the access point. This may reduce the power consumption of the external device because of the short link distance to the wireless terminal. Since the wireless terminal is typically connectable to an AC power source, the external device may in this way take advantage of the power source of the wireless terminal to reduce its own power consumption. Although the external device is typically a mobile phone, it may also be a gaming device, a digital camera, an MP3 player, or a wireless sensor, for example, or any such device with a limited power source.

Figure 5:
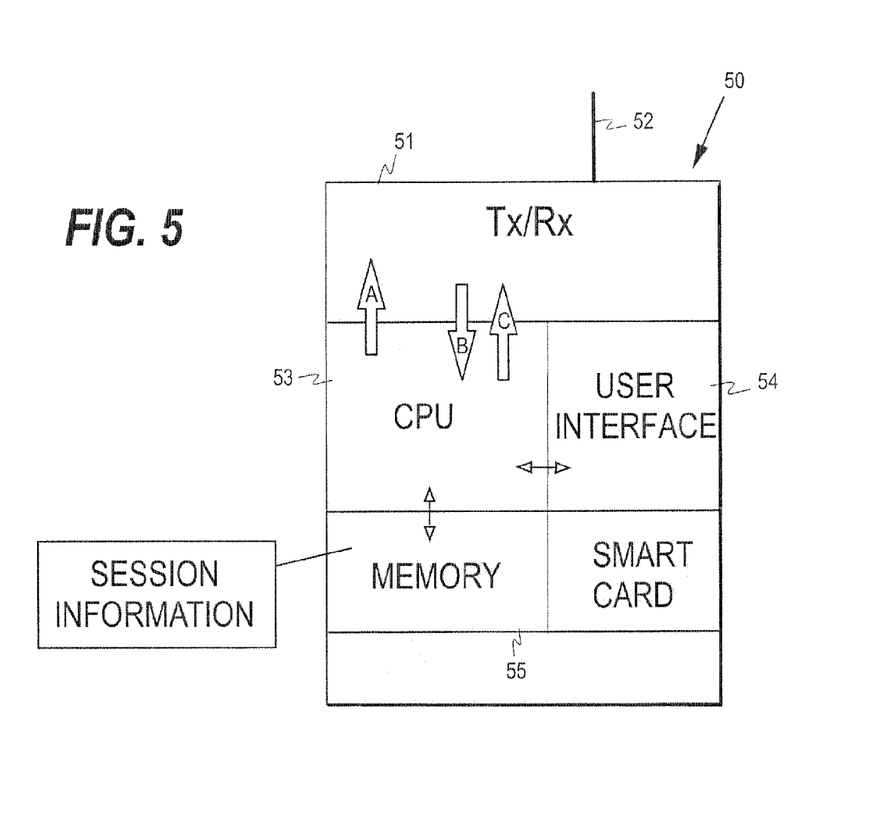
FIG. 5 illustrates one embodiment of a terminal according to the invention.

FIG. 5 illustrates the basic elements of the wireless terminal and the external device according to one embodiment of the invention. The terminal/device 50 comprises a transceiver 51 provided with at least one antenna 52, a control unit 53, user interface means 54 for creating a user interface through which the user can operate the terminal, and memory means 55, which may include one or more smart cards 56, such as one of the above-mentioned identity modules. However, as discussed above, an identity module is not included in a traditional WLAN terminal. The control unit performs the above-described functions of the invention. In other words, in the party sending the protection frame the control unit may estimate the length of the point-to-point session, trigger the sending of the protection frame, and control the subsequent data exchange with the external device (arrow A in the figure), whereas in the party receiving the protection frame the control unit may monitor the occurrence of the receipt of the protection frame and control the subsequent data exchange with the wireless terminal (arrows B and C in the figure).

The memory means include the MAC MIB or a similar database, which may include the control information needed for the above-described operation, such as information about the point-to-point session. The algorithm for calculating the session length may also be stored in the database. As described in the above-mentioned earlier PCT application, the database may also include the control information needed for controlling the performance of the receiver.

The data processing environment of the control unit may resemble that of an ordinary PC, and the mechanism of the invention may be introduced separately into an existing terminal/device, for example in a multimedia card. It is also possible that the control mechanism, i.e. the program code that causes the control unit to control in the above-described manner, is delivered as a separate plug-in software module which may be downloaded to the device/terminal via the network.

In a manufacturing phase, the mechanism of the invention may also be introduced into a terminal/device in a chip or chip set implementing the above-described functionality. The chip/chip set, which may include one or more ASICs, may be fabricated by a semiconductor foundry which has various circuit designs for the fabrication. The foundry may be selected, for example, from the Semiconductor Industry Association Directory, available from the Semiconductor Industry Association, 181 Metro Drive, Suite 450, San Jose, Calif. 95110, USA.

Although the invention was described above with reference to the examples shown in the appended drawings, it is obvious that the invention is not limited to these, but may be modified by those skilled in the art without departing from the scope and spirit of the invention. As discussed above, the invention may be utilized in connection with any networks in which a virtual carrier-sensing mechanism may be used to reserve the medium by sending a protection frame or a similar message/packet. The invention may therefore be used in systems provided with different physical transmission techniques, such as WLAN or Ultra Wide-Band (UWB). It is not even necessary that the external communication device understands the protection frame, i.e. the radio technology used on the point-to-point link may be different than the one used in the infrastructure network. However, in this case the wireless communication terminal must send a separate indication to the external device, thereby indicating that the point-to-point session is about to begin. Instead of establishing a point-to-point link with one external device, the wireless terminal may also establish, in one embodiment of the invention, a multipoint connection with a plurality of external devices.

The invention claimed is:

1. A method comprising:
  sending a protection frame from a first wireless communication terminal, the protection frame including duration information used for virtual carrier-sensing in an infrastructure network; and
  in response to the sending, communicating data with a second wireless communication terminal via a common medium used by the infrastructure network, wherein one of the first and second wireless communication terminals is configured to use a first access point in the infrastructure network and the other one of the first and second wireless communication terminals is external to the infrastructure network and is configured to use a second access point not in the infrastructure network, and the one of the first and second wireless communication terminals operating in the infrastructure network maintains a connection to the infrastructure network while directly communicating with the other one of the first and second wireless communication terminals external to the infrastructure network without using any intermediary terminal.

2. The method according to claim 1, wherein the sending includes the protection frame being addressed to the second wireless communication terminal.

3. The method according to claim 1, wherein the sending includes the protection frame being addressed to the first wireless communication terminal.

4. The method according to claim 3, wherein the sending includes sending the protection frame addressed to the first wireless communication terminal, in which the protection frame comprises a clear to send frame.

5. The method according to claim 1, wherein the communicating data includes exchanging frames, in which consecutive frames are spaced at intervals corresponding substantially to short inter frame space.

6. The method according to claim 1, wherein the sending includes sending the protection frame at maximum power level.

7. The method according to claim 1, wherein the communicating data includes transmitting the data at a reduced power level.

8. The method according to claim 1, wherein the communicating data comprises performing the communicating data during a time period indicated by the duration information.

9. The method according to claim 1, further comprising transmitting a further protection frame, wherein the transmitting is performed during a time period indicated by said duration information.

10. The method according to claim 1, further comprising relaying the data via said one of the first and second wireless communication terminals.

11. The method according to claim 1, further comprising scheduling the communicating data according to internal functions of the infrastructure network.

12. The method according to claim 11, wherein the scheduling includes synchronizing the communicating data with beacon transmissions within the infrastructure network.

13. A method comprising:
monitoring receipt of a protection frame transmitted from a first wireless communication terminal, the protection frame including duration information used for virtual carrier-sensing in an infrastructure network, wherein the monitoring is performed at a second wireless communication terminal;
receiving the protection frame at the second wireless communication terminal; and
in response to the receiving, communicating data with the first wireless communication terminal via a common medium used by the infrastructure network, wherein one of the first and second wireless communication terminals is configured to use a first access point in the infrastructure and the other one of the first and second wireless communication terminals is external to the infrastructure network and is configured to use a second access point not in the infrastructure network, and the one of the first and second wireless communication terminals operating in the infrastructure network maintains a connection to the infrastructure network while directly communicating with the other one of the first and second wireless communication terminals external to the infrastructure network without using any intermediary terminal.

14. The method according to claim 13, wherein the receiving includes the protection frame being addressed to the second wireless communication terminal.

15. The method according to claim 13, wherein the receiving includes the protection frame being addressed to the first wireless communication terminal.

16. The method according to claim 15, wherein the receiving includes receiving the protection frame addressed to the first wireless communication terminal, in which the protection frame comprises a clear to send frame.

17. The method according to claim 13, wherein the communicating data includes exchanging frames, in which consecutive frames are spaced at intervals corresponding substantially to short inter frame space.

18. The method according to claim 13, wherein the communicating data comprises performing the communicating data during a time period indicated by the duration information.

19. The method according to claim 13, wherein the monitoring includes degrading receiver performance for reducing power consumption in the second wireless communication terminal during the monitoring.

20. The method according to claim 19, wherein the degrading receiver performance includes adjusting receiver sensitivity.

21. The method according to claim 20, wherein the degrading receiver performance includes adjusting the dynamic range of the receiver of the second wireless communication terminal.

22. An apparatus comprising:
a link protection unit configured to send a protection frame including duration information used for virtual carrier-sensing in an infrastructure network; and
a data transfer unit, responsive to the link protection unit, configured to directly communicate data with an external wireless communication device, without using any intermediary terminal, via a common medium used by the infrastructure network, during a time period indicated by the duration information and while maintaining a connection to a first access point in the infrastructure network, wherein the external wireless communication device is external to the infrastructure network and is configured to use a second access point not in the infrastructure network.

23. The apparatus according to claim 22, wherein the protection frame is addressed to the external wireless communication device.

24. The apparatus according to claim 22, wherein the protection frame comprises a clear to send frame addressed to the external wireless communication device.

25. The apparatus according to claim 24, wherein the data transfer unit is configured to send a further frame to the external wireless communication device, the protection frame and the further frame being spaced an interval apart, the interval corresponding substantially to short inter frame space.

26. The apparatus according to claim 22, wherein the link protection unit is configured to send a further protection frame during said time period.

27. The apparatus according to claim 22, wherein the link protection unit and the data transfer unit are implemented as a chip set.

28. An apparatus comprising:
- a monitoring unit configured to monitor receipt of a protection frame transmitted from a wireless communication terminal belonging to an external infrastructure network, the protection frame including duration information used for virtual carrier-sensing in the external infrastructure network; and
- a data transfer unit, responsive to the monitoring unit, configured to communicate data directly with the wireless communication terminal, without using any intermediary terminal, via a common medium used by the external infrastructure network during a time period indicated by the duration information while the wireless communication terminal maintains a connection to a first access point in the external infrastructure network, wherein the apparatus is configured to use a second access point not in the external infrastructure network.

29. The apparatus according to claim 28, wherein the data transfer unit is configured to send a further frame to the wireless communication terminal, the protection frame and the further frame being spaced an interval apart, the interval corresponding substantially to short inter frame space.

30. The apparatus according to claim 28, wherein the wireless communication terminal is a mobile phone.

31. The apparatus according to claim 28, wherein the monitoring unit and the data transfer unit are implemented as a chip set.

32. An apparatus comprising:
- a link protection unit configured to send a protection frame including duration information used for virtual carrier-sensing in an external infrastructure network; and
- a data transfer unit, responsive to the link protection unit, configured to directly communicate data with a wireless communication terminal belonging to the external infrastructure network, without using any intermediary terminal, via a common medium used by the external infrastructure network, during a time period indicated by the duration information while the wireless communication terminal maintains a connection to a first access point in the external infrastructure network and the apparatus is configured for connection to a second access point not in the external infrastructure network.

33. The apparatus according to claim 32, further comprising a download unit-configured to retrieve information about the external infrastructure network from the wireless communication terminal, the link protection unit being responsive to the download unit.

34. A non-transitory computer readable medium comprising computer program code means adapted to perform the steps of the method of claim 1 when said program is run on a computer.

35. The non-transitory computer readable medium comprising computer program code means adapted to perform the steps of the method of claim 13 when said program is run on a computer.

36. An apparatus comprising:
- a control unit, and
- at least one memory including computer program code, the at least one memory and the computer program code configured to, with the control unit, cause the apparatus at least to
- send a protection frame including duration information used for virtual carrier-sensing in an infrastructure network; and
- transfer, in response to sending the protection frame, data directly to an external wireless communication device, without using any intermediary terminal, via a common medium used by the infrastructure network, during a time period indicated by the duration information while maintaining a connection to a first access point in the infrastructure network, wherein the external wireless communication device is external to the infrastructure network and is configured for connection to a second access point not in the infrastructure network.

37. An apparatus comprising:
a control unit configured for using a first access point, and
at least one memory including computer program code, the at least one memory and the computer program code configured to, with the control unit, cause the apparatus at least to
monitor receipt of a protection frame transmitted from a wireless communication terminal configured to use an external infrastructure network having a first access point, wherein apparatus is configured to use a second access point not in the external infrastructure network, the protection frame including duration information used for virtual carrier-sensing in the external infrastructure network; and
transfer, in response to receipt of the protection frame, data directly to the wireless communication terminal, without using any intermediary terminal, via a common medium used by the external infrastructure network, during a time period indicated by the duration information while the wireless communication terminal maintains a connection to the external infrastructure network.

* * * * *